(No Model.)
W. S. PATES.
SULKY PLOW.
No. 309,489. Patented Dec. 16, 1884.
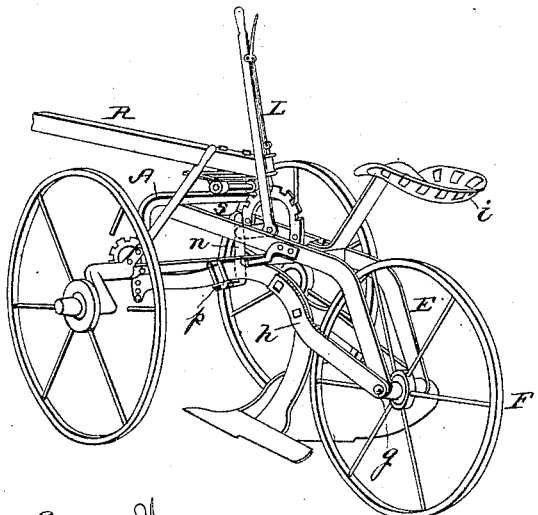
Fig. 1.
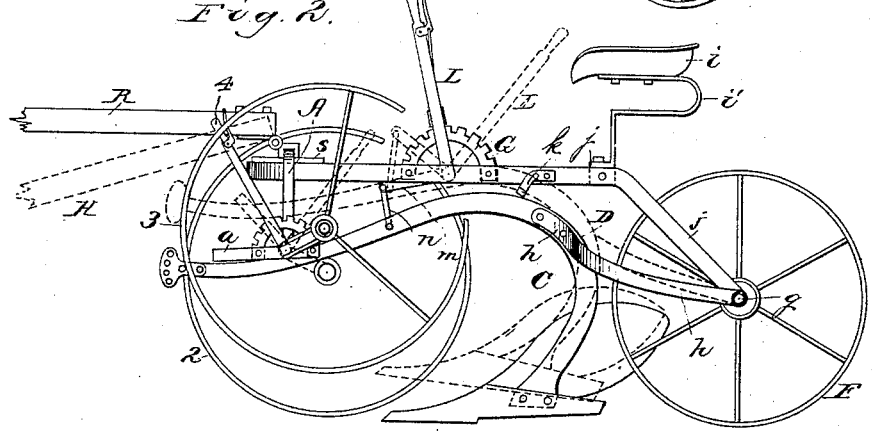
Fig. 2.
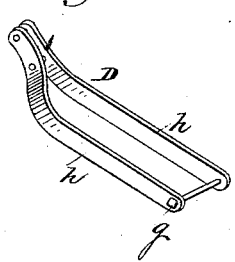
Fig. 5.
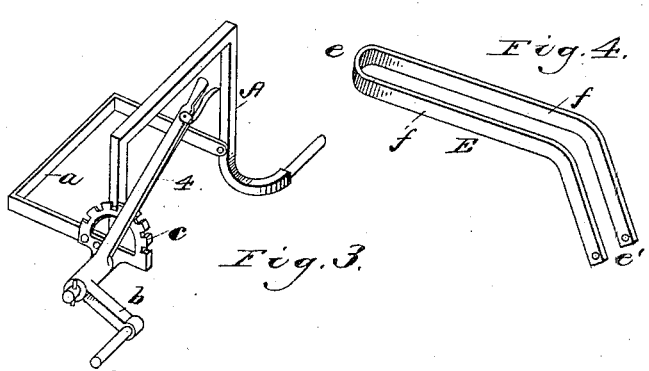
Fig. 4.
Fig. 3.
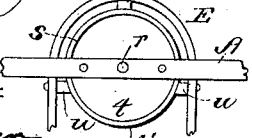
Fig. 6.
Witnesses,
Henry Frankfurter
Sam'l B. Dover
Inventor,
William S. Pates
By John Lane,
his Attorney.
N. PETERS. Photo-Lithographer, Washington, D. C.

UNITED STATES PATENT OFFICE.

WILLIAM S. PATES, OF ALTON, ILLINOIS, ASSIGNOR TO HAPGOOD PLOW COMPANY, OF SAME PLACE.

SULKY-PLOW.

SPECIFICATION forming part of Letters Patent No. 309,489, dated December 16, 1884.

Application filed August 9, 1884. (No model.)

*To all whom it may concern:*

Be it known that I, WILLIAM S. PATES, a citizen of the United States, residing at Alton, in the county of Madison and State of Illinois, have invented a new and useful Improvement in Sulky-Plows, of which the following is a specification.

My invention relates to sulky-plows of that class having three wheels, in which a truck with two wheels is in advance of the plow, and a rear wheel directly in rear of the plow.

My invention consists in certain improvements, which will first be described in the specification, and afterward pointed out in the claims.

Referring to the drawings, like letters refer to like parts in all the figures, in which Figure 1 is a perspective view of my improved sulky-plow, shown as standing on level ground. Fig. 2 is a side elevation showing my improved sulky-plow in position for work, and with parts of the frame and wheel broken away to bring into view the operating-lever and its connection with the plow-beam, and also showing by the dotted lines how the several parts are moved to the position as when out of work. Fig. 3 is a perspective view enlarged, showing the axle A, bail $a$, crank-arm $b$, and segment $c$. Fig. 4 is a perspective view of the frame B constructed of a single bar. Fig. 5 is a perspective view of the yoke D and bolt $g$. Fig. 6 is a plan view showing the fifth-wheel, frame, and axle, (the view being enlarged;) also showing how the platform $t'$ may be provided with wings or lugs $u$ for attachment to the frame with bolts or rivets.

The plow C may be an ordinary plow with the bent beam provided with the yoke D, said yoke consisting of two bars, $h\ h$, bent and curved, and rigidly attached to the said beam, and thence extending rearwardly astride of the rear wheel, and their rear ends connected pivotally to the frame, and by which said plow is held upright, preventing its careening, while allowing a free movement up and down. The frame E preferably consists of a single bar bent and doubled at its center, forming a closed front end, $e$, open rear end, $e'$, and parallel sides or legs $f\!f$, the rear part of said legs bent downwardly astride of the rear wheel, and their rear ends journaled on or attached to the axle of the said rear wheel. The said frame E has attached thereto and supports the fifth-wheel, the operating-lever and segment, the seat, feet rests or stirrups, the plow, and rear wheel, as will be hereinafter more fully shown. The rear wheel, F, may be an ordinary wheel journaled on the axle or bolt $g$, directly in rear of the plow, and the said bolt $g$ may serve to connect the yoke D to the frame E, while extending through the hub of said wheel as an axle, as shown in the drawings. The seat $i$, provided with the spring-bar $i'$, may be connected to the said frame by means of the cross-bar or brace $j$, and the said cross-bar rigidly attached to both legs of the frame, as will be understood by inspecting the drawings, Figs. 1 and 2.

$k$ represents the foot-rest, which may be a bent iron stirrup attached to the frame E with bolts or rivets, as shown.

The segment G is provided with the usual notches, and rigidly attached to the frame E with bolts or rivets, the operating-lever L, connected pivotally in the center of said segment, and the said lever provided with the usual thumb-latch and lock for locking and unlocking said lever to the segment, as ordinary, and shown in the drawings. The operating-lever L is provided with a short arm, $m$, extending forward from its bottom end, and the said short arm connected with the plow-beam $d$ by means of the link $n$, as shown in Fig. 2, in which one end of said link is shown pivoted in the said short arm, and the other end pivoted in a perforation in the said plow-beam. I sometimes, and preferably, use a bracket, $p$, which is adjustably attached to the plow-beam, the bottom end of the link $n$ pivoted on the said bracket, as will be understood, and shown in Fig. 1. The object of the said bracket is to adjust the said link-connection forward or back on the plow-beam. The operation of the said operating-lever L will be understood by the dotted lines in Fig. 2, in which the long arm of the said lever is shown moved rearward, carrying the short arm upward, and the plow elevated above the ground. The operator moves the said lever forward and back, gaging the depth of plowing, locking the said lever to the segment G in any position desired. In this case the said plow is connected to the frame only by the pivotal connection at the rear end of the yoke, directly in rear of the plow, the front end of the said plow being unconnected, and having a free movement up and down, the said yoke operating to hold the plow upright, also, in connection with the draft, operating to hold the plow in line of draft with its work, the operator gaging the depth of plowing and elevating the plow out of work by a movement of the lever L, depressing or elevating the forward end of the beam, as will be understood by inspecting the drawings in Fig. 2. The truck consists of the axle A, having the crank-arm $b$, with its usual leveling-lever and segment, the two wheels 2 3, the bail $a$, having one end rigidly attached to the said segment, and extending forward of the said axle, and tongue R, as shown in the drawings. The said truck is connected to the frame in advance of the plow by means of the fifth-wheel.

$s$ represents the fifth-wheel, preferably constructed of two circular or ring-plate platforms, $t\ t'$, rigidly secured, respectively, to the said truck and frame, and connected together by a king-bolt, $r$, at the center of oscillation, and holding the truck upright, while permitting it to oscillate laterally about the king-bolt, without disturbing the plow or frame or moving them from the line of draft. The said fifth-wheel also serves as a sole support to prevent the careening of the frame in holding and keeping the frame rigidly upright in line of draft and the frame unaffected by the swaying or moving of the horses, moving the tongue up or down or laterally, or oscillating the truck; and it will be observed that by reason of the tongue being hinged to the axle the said fifth-wheel is also a sole support to prevent the careening of the truck forward and back.

The axle A is constructed with an arched center, with perpendicular sides and extending arms, one arm being rounded and the wheel 2 rotary thereon, the other arm being rounded, and a crank-arm, $b$, carrying the wheel 3, rotary thereon, and the segment $c$ loosely rotary on the said latter arm, and a leveling-lever, 4, rigidly attached to the said crank-arm. The said leveling-lever is provided with the usual thumb-latch and detent or lock for adjusting and locking the said lever to the segment, as shown, and will be understood by the drawings.

R represents a tongue, which may have its rear end connected to the axle A by a hinged joint by which the forward end of the said tongue has a free movement up and down.

$a$ represents the bail, consisting of a bar preferably bent somewhat U shape, having its closed end seated or resting on the plow-beam $d$, unconnected therewith forward of the axle A, its legs extending rearward, and one of its legs rigidly attached to the segment $c$ with bolts or rivets, and the other leg may be pivotally or loosely attached to the opposite side of said axle, as shown in Fig. 3, by which the said bail has a free up-and-down movement, and also by which movement a movement of the plow-beam $d$ upward, the said beam pushing and carrying the said bail $a$ upward, moving the wheel 3 downward, and in a movement of the beam downward the weight of truck will cause the bail to follow the beam downward and move the wheel upward, and by which, when the operator moves the operating-lever adjusting or elevating the plow, the said wheel will be moved in an opposite direction to the movement of the plow, and the truck will be kept level thereby in or out of work and in all depth of plowing, the operator having first adjusted the crank-arm by a movement of the leveling-lever 4, independent of any movement of the bail, and locked it to the segment $c$, leveling the truck for its work after having plowed the first furrow in laying out a land in which the said leveling-lever had been moved forward to compensate for the wheel 2 having no furrow to run in.

The plow-beam is provided with the usual clevis connecting direct with the whiffletrees and team by which the draft or moving power is applied to the front end of the beam, as in ordinary hand or walking plows, and the said draft or moving power is transmitted to the frame and truck only through the connection of the frame and yoke in rear of the plow, as will be understood by inspecting the drawings.

By reason of my invention I am enabled to make a three-wheeled sulky-plow of light weight, a desirable feature for the light soils of the Western States, strong and durable, and more simple and inexpensive in construction than has heretofore been attained.

I am aware that a truck in advance with a single wheel in the rear of a plow is not new; that the fifth-wheel in a three-wheel sulky-plow has been before used, and that a tongue hinged to the axle of a truck is old. Such I do not broadly claim.

I claim—

1. The combination of the plow C, provided with the yoke D, the frame E, and rear wheel, F, with a truck provided with two wheels and a loosely-hinged tongue in advance of the plow, substantially as and for the purpose set forth.

2. The frame E, consisting of a single bar bent having the closed end $e$, the open end $e'$, and parallel sides $f\ f$, as shown, in combination with the plow C, and a truck in advance of said plow, and with a wheel directly in rear of said plow, substantially as and for the purpose set forth.

3. The combination of the plow C, provided with the yoke D, the frame E, and wheel F, with the bolt $g$, the said bolt serving to connect the said yoke, frame, and wheel, and with a truck in advance of the plow, substantially as and for the purpose set forth.

WILLIAM S. PATES.

Witnesses:
CHAS. S. PHILIPS,
WM. R. PINCKARD.